(12) United States Patent
Barnette et al.

(10) Patent No.: US 6,758,562 B1
(45) Date of Patent: Jul. 6, 2004

(54) EYEWEAR WITH FRAMES HAVING FLEXIBLE EARSTEMS

(75) Inventors: Robert Barnette, Portland, OR (US); Gray Holland, San Francisco, CA (US)

(73) Assignee: Nike, Inc., Beaverton, OR (US)

( * ) Notice: Subject to any disclaimer, the term of this patent is extended or adjusted under 35 U.S.C. 154(b) by 0 days.

(21) Appl. No.: 10/342,129

(22) Filed: Jan. 13, 2003

(51) Int. Cl.⁷ ................................................. G02C 5/14
(52) U.S. Cl. ........................ 351/111; 351/114; 351/123
(58) Field of Search ................................ 351/111, 114, 351/122, 123, 62, 41, 156, 157

(56) References Cited

U.S. PATENT DOCUMENTS

| | | |
|---|---|---|
| D130,831 S | 12/1941 | Uhlemann |
| D146,601 S | 4/1947 | Jaffe |
| D146,603 S | 4/1947 | Jaffe |
| 3,582,194 A | 6/1971 | Liautand |
| D227,164 S | 6/1973 | Shindler |
| D319,647 S | 9/1991 | Wilson |
| D333,312 S | 2/1993 | Paysan et al. |
| 5,189,447 A | 2/1993 | Oleson |
| 5,243,711 A | 9/1993 | Graham |
| D344,282 S | 2/1994 | Hirschman |
| 5,589,895 A | 12/1996 | Mizuno |
| D380,766 S | 7/1997 | Simioni |
| D389,504 S | 1/1998 | Simioni |
| D394,871 S | 6/1998 | Simioni |
| 5,760,868 A | 6/1998 | Jannard et al. |
| D397,711 S | 9/1998 | Zeng |
| D397,712 S | 9/1998 | Simioni |
| D423,548 S | 4/2000 | Yee et al. |
| D438,232 S | 2/2001 | Grimaldi |
| 6,349,422 B1 | 2/2002 | Schleger et al. |
| 6,513,925 B1 * | 2/2003 | Bonacci ........................ 351/43 |
| 6,629,760 B1 * | 10/2003 | Razin ........................ 351/156 |

* cited by examiner

Primary Examiner—Hung X. Dang
(74) Attorney, Agent, or Firm—Banner & Witcoff, Ltd.

(57) ABSTRACT

The invention is frames for an article of eyewear. The frames include a pair of earstems structured to extend along a side of the head and over ears of the individual. The earstems have a curved structure that extends around to a rear surface of the head such that distal ends of the earstems have a separation less than a width of the head. The earstems each define a plurality of elongate apertures located adjacent the distal ends and extending in a substantially vertical direction. The elongate apertures may have an elliptical shape and serve to enhance the flexibility of the earstems.

52 Claims, 4 Drawing Sheets

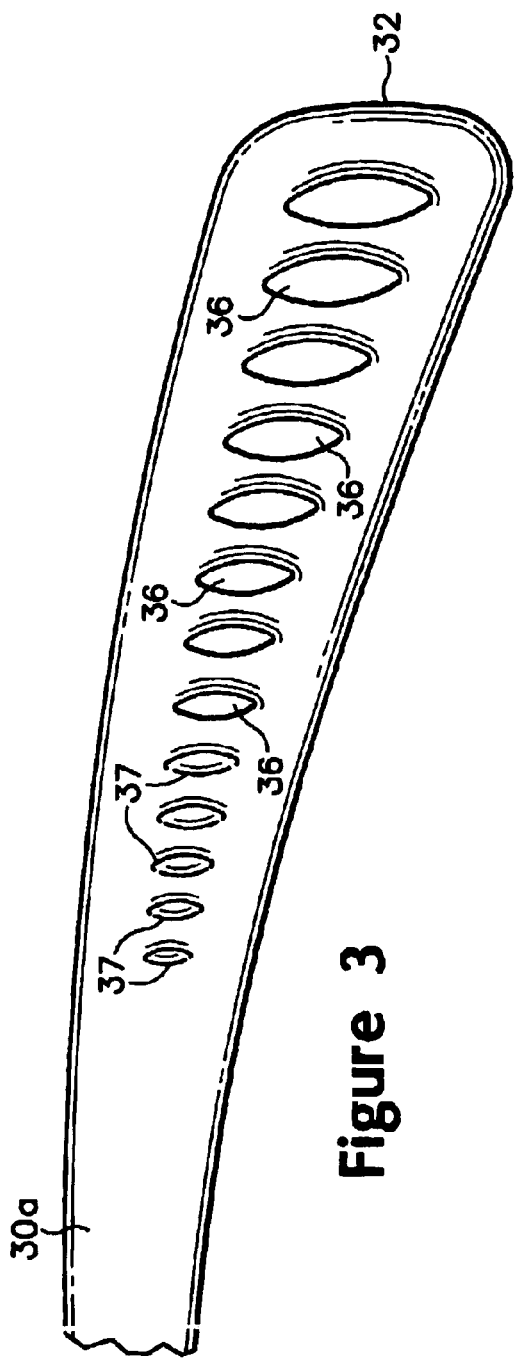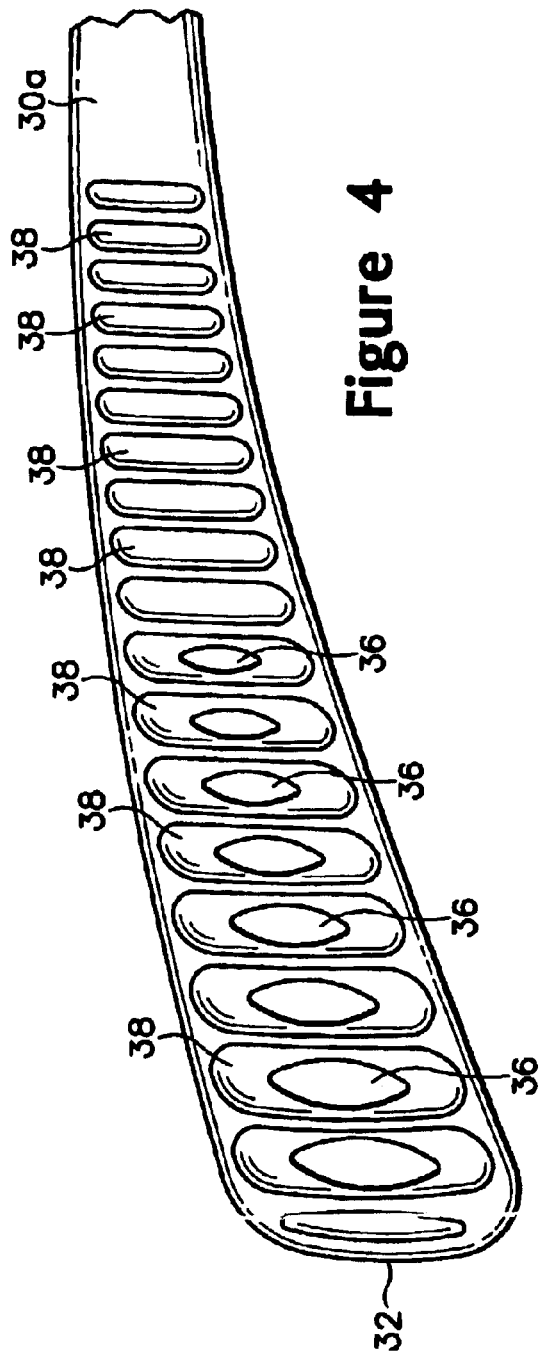

EYEWEAR WITH FRAMES HAVING FLEXIBLE EARSTEMS

BACKGROUND OF THE INVENTION

1. Field of the Invention

The present invention relates to eyewear. The invention concerns, more particularly, eyewear wherein an earstem configuration includes a plurality of apertures for enhancing flexibility of the earstem.

2. Description of Background Art

Conventional articles of eyewear include two primary components, lenses and frames. The lenses generally function to (1) correct visual defects by refracting light waves; (2) attenuate the intensity of light incident upon the eyes; or (3) prevent objects or debris, such as dust and water, from contacting or entering the eyes. Many articles of eyewear impart a combination of benefits. For example, individuals commonly utilize articles of eyewear that corrects visual defects and attenuate the intensity of light. Suitable materials for the lenses include optical polymers and glass.

The frames conventionally include a support section and a pair of earstems. The primary purpose of the frames is to position the lenses relative to the eyes. In this regard, the support section receives the lenses and secures the lenses to the frames. A common type of support section forms apertures that receive the lenses. Many other conventional types of eyewear, however, include a support section that either extends only partially around the lenses or protrudes through the lenses to secure the lenses to the frames. The earstems are attached to the support section and extend backward from the support section. To provide compact storage, the earstems may be hinged with respect to the support section, as disclosed in U.S. Pat. No. 5,589,895 to Mizuno. The earstems may also be integrally-formed with the support section, as disclosed in U.S. Design Pat. No. D438,232 to Grimaldi.

When worn by an individual, the support section generally rests upon the nose to position the lenses in front of the eyes, and the earstems extend in a backward direction over the ears. Conventional articles of eyewear make contact, therefore, in three locations and remain securely situated upon the head throughout most daily activities. During activities where conventional articles of eyewear may not remain properly situated, such as sporting activities, the conventional structure of eyewear is often modified to provide greater stability. For example, the eyewear may incorporate an elastic strap that extends between ends of the earstems.

Another manner in which eyewear may be modified to provide additional stability relates to the structure of the earstems. More specifically, the earstems may have a curved configuration that extends around a back portion of the head, rather than around the ears. A limitation to this configuration, however, is that inflexibility of the material forming the earstems may reduce the ease with which the eyewear may be placed upon the head and removed from the head.

SUMMARY OF THE INVENTION

The present invention is an article if eyewear and an earstem for the article of eyewear. The earstem includes a connection portion and a distal portion. The connection portion is configured to connect the earstem to the article of eyewear and extends in a longitudinal direction. The distal portion is located opposite the connection portion and defines a plurality of apertures extending through the earstem. The apertures include at least one aperture with an elongate configuration, the at least one aperture being oriented to substantially coincide with a vertical direction that is orthogonal to the longitudinal direction.

The connection portion may have a substantially straight configuration so as to extend along the side of the head. The distal portion, however, may be curved in a lateral direction, which is orthogonal to both the longitudinal direction and the vertical direction, to extend around to a rear surface of the head. In addition, the distal portion may be curved in the vertical direction. When utilized in combination with a similar earstem and a support section to form frames for the article of eyewear, the distance between distal ends of the earstems may be less than with conventional articles of eyewear. Accordingly, an individual may be required to flex the earstems in the lateral direction, thereby separating the distal ends. The apertures formed in the distal portion enhance the flexibility of the earstem and permit the earstems to be separated.

The apertures may be arranged serially to extend along a length of the distal portion. This configuration provides flexibility throughout the distal portion. Other features that may be utilized to enhance the flexibility include dimples or grooves formed in the distal portion. Whereas the dimples may be separate from the apertures, the grooves may be superimposed over the apertures. In addition, the lateral thickness of the distal portion may be decreased in comparison with the connection portion. The material selected for the earstem also has an effect upon the overall flexibility in the distal portion of the earstem.

The advantages and features of novelty characterizing the present invention are pointed out with particularity in the appended claims. To gain an improved understanding of the advantages and features of novelty, however, reference may be made to the following descriptive matter and accompanying drawings that describe and illustrate various embodiments and concepts related to the invention.

DESCRIPTION OF THE DRAWINGS

The foregoing Summary of the Invention, as well as the following Detailed Description of the Invention, will be better understood when read in conjunction with the accompanying drawings.

FIG. 3 is a first partial side elevational view that depicts an outward-facing surface of a portion of an earstem of the eyewear.

FIG. 4 is a second partial side elevational view that depicts an opposite inward-facing surface of the portion depicted in FIG. 3.

DETAILED DESCRIPTION OF THE INVENTION

With reference to the following discussion and accompanying figures, articles of eyewear having earstems in accordance with the present invention are disclosed. The eyewear is depicted as having a configuration that is suitable for use during athletic activities. The concepts disclosed with reference to the earstems, however, may be applied to eyewear styles that are suitable for a variety of activities. Accordingly, the present invention is not limited to the specific embodiments discussed below and depicted in the figures. Rather, the present invention is intended to encompass and apply to a wide range of eyewear styles.

An article of eyewear 10 is depicted in FIGS. 1–6. The primary elements of eyewear 10 are a pair of lenses 11a and 11b and frames 12. Lenses 11a and 11b are secured within frames 12 and may be utilized to correct visual defects, attenuate light, or protect of the eyes from objects or debris, for example. The material forming lenses 11a and 11b may be an optical polymer or glass that is optically shaped to refract light, thereby correcting visual defects such as nearsightedness, farsightedness, or astigmatism. The material may also incorporate a tint or surface coating that limits the amount of light incident upon the eye. Depending upon the intended use for eyewear 10, lenses 11a and 11b may be structured to only refract light, only attenuate light, or serve a combination of refractive and attenuative functions, for example. Accordingly, the specific properties of lenses 11a and 11b may vary significantly within the scope of the present invention to impart any of the functions conventionally provided by eyewear lenses. As an alternative to the use of two lenses 11a and 11b, a single lens formed of an optically-transparent sheet may extend across a front portion of frames 12.

Figure 1:
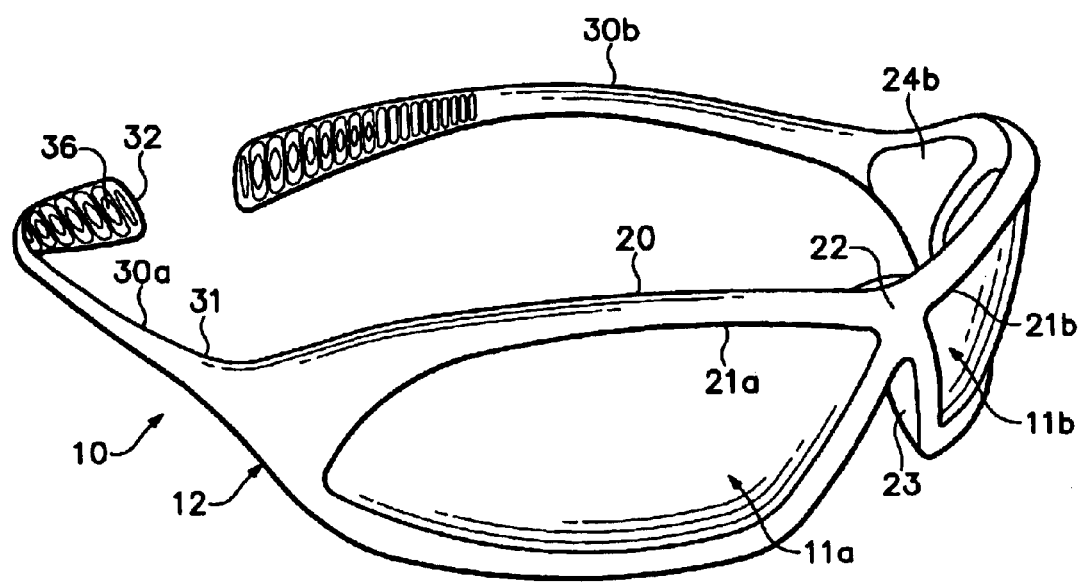
FIG. 1 is a perspective view of an article of eyewear in accordance with the present invention.
Figure 2:
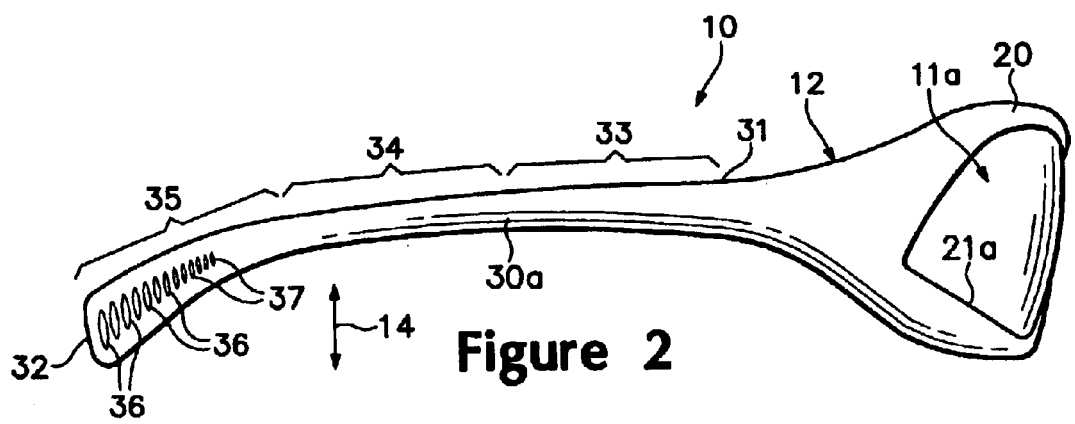
FIG. 2 is a side elevational view of the article of eyewear.
Figure 5:
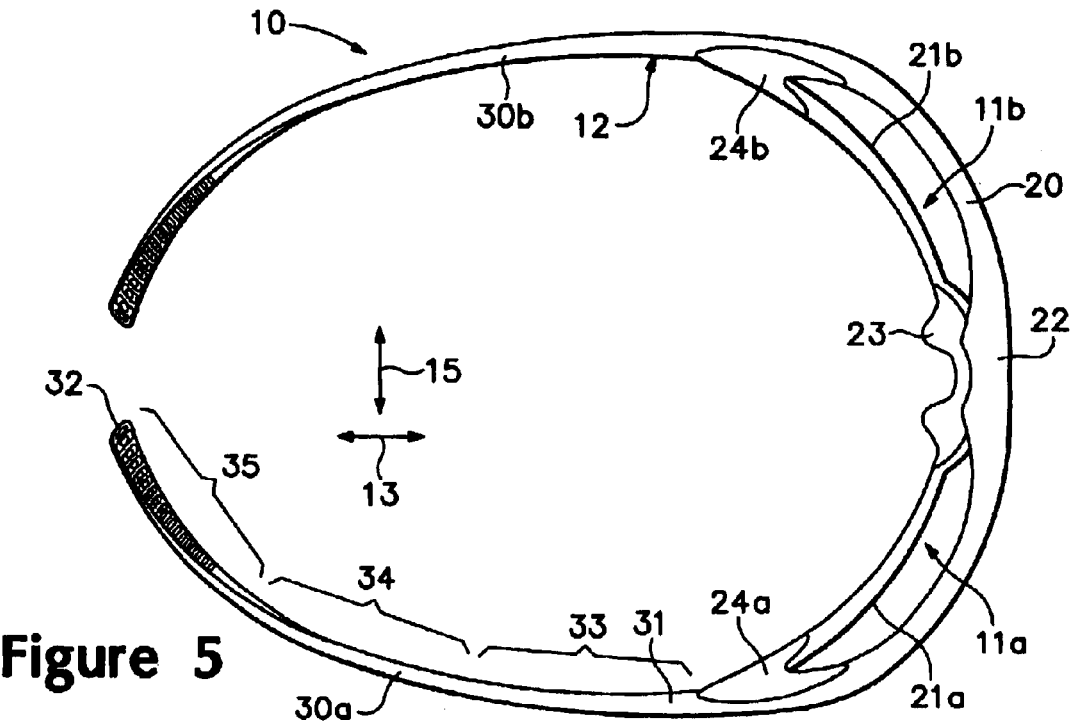
FIG. 5 is a first top view of the frames in an unflexed configuration.
Figure 6:
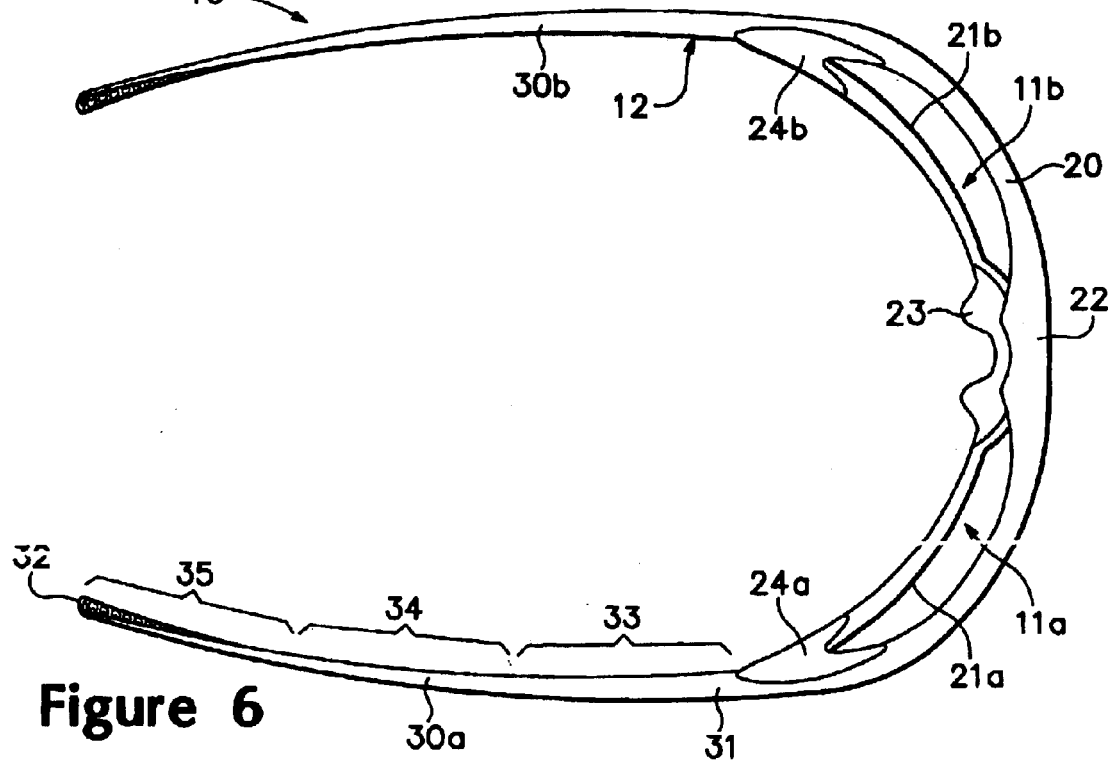
FIG. 6 is a second top view of the frames in a flexed configuration.
Figure 7:
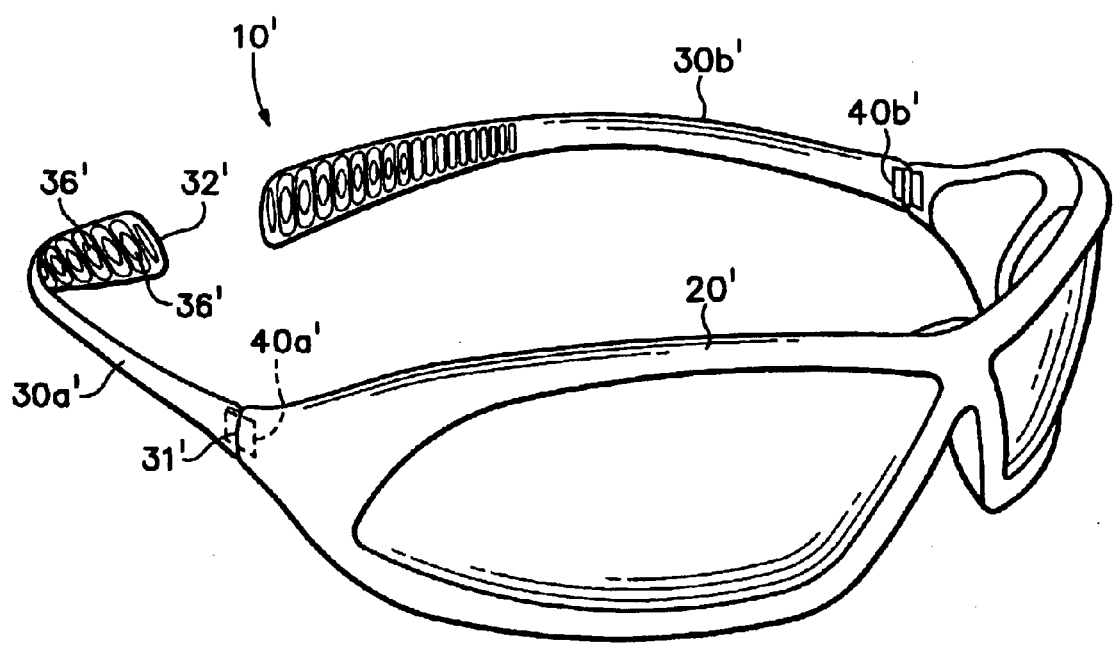
FIG. 7 is a perspective view of another article of eyewear in accordance with the present invention.

The primary elements of frames 12 are a support section 20 and a pair of earstems 30a and 30b. As depicted in FIGS. 1–6, support section 20 is formed integral with earstems 30a and 30b so as to have a hingeless structure. That is, support section 20 and earstems 30a and 30b are formed as an individual element through the same manufacturing process. In a further embodiment, which is depicted in FIG. 7, eyewear 10' includes a support section 20' that is formed separate from earstems 30a' and 30b', and a pair of hinges 40a' and 40b' are located between each of earstems 30a' and 30b' and support section 20', respectively. Hinges 40a' and 40b' may be utilized to fold earstems 30a' and 30b' relative to support section 20', thereby facilitating compact storage of eyewear 10'.

Support section 20 is structured to securely receive lenses 11a and 11b and form a point of contact between eyewear 10 and the nose. In this regard, support section 20 includes a pair of receptacles 21a and 21b that form apertures for receiving lenses 11a and 11b. A bridge 22 extends between receptacles 21a and 21b, and a rest 23 is located behind bridge 22. When worn by the individual, bridge 22 extends over the nose such that rest 23 contacts and rests upon the nose. Support section 20 may also include a pair of temple elements 24a and 24b that provide cushioning should eyewear 10 move laterally relative to a head upon which eyewear 10 is worn. Rest 23 and temple elements 24a and 24b may be formed of a rubber or silicone material that is resilient and water-resistant. The specific configuration of support section 20 may, however, vary significantly within the scope of the present invention.

The structure of earstem 30a is substantially similar to the structure of earstem 30b. Accordingly, the following discussion will focus primarily upon earstem 30a, with an understanding that the concepts and features disclosed with respect to earstem 30a also apply to earstem 30b. Earstem 30a has an elongate structure with a connection end 31 and a distal end 32. With respect to the embodiment of FIGS. 1–6, connection end 31 is formed integral with support section 20. In the embodiment of FIG. 7, however, connection end 31' is formed separate from support section 20' such that hinge 40a' permits earstem 30a' to rotate in relation to support section 20'. Distal end 32 is located opposite connection end 31 and forms a terminal portion of earstem 30a.

For purposes of reference in the following discussion, earstem 30a may be divided into a connection portion 33, a central portion 34, and a distal portion 35. Connection portion 33 encompasses the area of earstem 30a located generally adjacent to connection end 31. Similarly, distal portion 35 encompasses the area of earstem 30a located generally adjacent to distal end 32. Central portion 34 is located between connection portion 33 and distal portion 35. Portions 33–35 are not intended to demarcate precise areas of earstem 30a. Rather, portions 33–35 are intended to define general areas of earstem 30a to aid in the following discussion.

Earstem 30a has a generally straight configuration in connection portion 33 that extends in a longitudinal direction. At an approximate midpoint of central portion 34, however, earstem 30a begins to curve away from the longitudinal direction so as to curve towards both a vertical direction and a lateral direction. The vertical and lateral curvature in earstem 30a continues through distal portion 35 such that earstem 30a forms a generally J-shaped structure when viewed in elevation and plan. For reference purposes, the longitudinal direction is represented by an arrow 13 in FIG. 5, the vertical direction is represented by an arrow 14 in FIG. 2, and the lateral direction is represented by an arrow 15 in FIG. 5. Note that the longitudinal direction, vertical direction, and lateral direction are orthogonal to each other to define axes in three-dimensional space. The curvature discussed above for earstem 30a may vary in further embodiments of the invention. For example, the curvature in the vertical and lateral directions may begin in connection portion 33, rather than in central portion 34.

The structure of earstem 30a described above complements the shape of a head of an individual. When eyewear 10 is properly placed upon the head, support section 20 rests upon the nose and positions lenses 11a and 11b in front of the eyes such that earstems 30a and 30b extend backward. The manner in which eyewear 10 fits the head depends upon the specific individual utilizing eyewear 10. In general, however, connection portion 33 is spaced away from the side of the head; central portion 34 extends over the ear and contacts the car and side of the head; and distal portion 35 curves around to a rear surface of the head and remains in contact with the head.

The earstems of many conventional articles of eyewear curve downward in the vertical direction to extend around and engage the back of the ear. Although the conventional configuration provides a relatively secure fit, the earstems may engage and induce excess stress in the ear if the eyewear is forcibly moved relative to the head. In eyewear 10, however, earstem 30a engages the rear surface of the head. If eyewear 10 is forcibly moved relative to the head, earstem 30a will slide relative to the head. Upon the application of lesser forces, however, eyewear 10 will remain properly positioned relative the head.

A vertical thickness and lateral thickness of earstem 30a, which corresponds approximately with the vertical direction and lateral direction, respectively, varies along the length of earstem 30a. At connection end 31, the vertical thickness and the lateral thickness of earstem 30a correspond with the thicknesses of support section 20 adjacent to connection end 31, thereby providing an aesthetic transition between support section 20 and earstem 30a. As connection portion 33 extends away from connection end 31, the vertical thickness and lateral thickness gradually decrease or taper. Through central portion 34, the vertical thickness remains substantially constant, but the lateral thickness continues to decrease gradually. In distal portion 35, however, the vertical thickness of earstem 30a increases or flares vertically to substantially increase the surface area of earstem 30a, whereas the overall lateral thickness of earstem 30a, which is at a minimum thickness, remains substantially constant.

A further characteristic of earstem 30a are a plurality of apertures 36 formed through distal portion 35. Apertures 36 each have an elongate shape that extends in a direction approximately corresponding with the vertical direction. With respect to the elongate shape, apertures 36 may be characterized as having an oval or elliptical configuration. Within the scope of the present invention, however, apertures 36 may have a variety of substantially elongate shapes that are generally oriented in the vertical direction, including such shapes as rectangles, isosceles triangles, or other geometric or non-geometric shapes, for example. As depicted in the figures, apertures 36 are linearly-arranged along earstem 30a so as to form a series of holes in distal portion 35. Apertures 36 may also be arranged in a non-serial manner. As apertures 36 approach distal end 32, the vertical height of apertures 36 increases such that the aperture 36 adjacent to distal end 32 has greater vertical height than other apertures 36. In further embodiments of eyewear 10, apertures 36 may have a constant height, a decreasing height, or a variety of changing heights.

The direction in which apertures 36 are oriented corresponds approximately with the vertical direction, as discussed above. More particularly, distal portion 35 is angled slightly away from the vertical direction in order to conform with the shape of the head. That is, distal portion 35 may be angled toward the longitudinal and lateral directions, for example, to provide a secure fit. This angle is present due to the specific portion of the head that distal portion 35 is intended to contact when worn. Accordingly, the angle may be greater in further embodiments that are intended to contact other portions of the head, or the angle may be absent such that distal portion 35 and apertures 36 are oriented with the vertical direction.

An outward-facing surface of distal portion 35 is depicted in FIG. 3 and includes a series of dimples 37. As apertures 36 extend away from distal end 32, the relative sizes of apertures 36 decrease such that the aperture 36 furthest from distal end 32 is relatively small in comparison with other apertures 36. In effect, dimples 37 continue from the series of apertures 36 to provide recessed areas in earstem 30a. A similar surface characteristic, which is a series of vertical grooves 38, is present on the inward-facing surface of distal portion 35 that is depicted in FIG. 4. Like dimples 37, grooves 38 extend beyond the series of apertures 36. In addition, some grooves 38 are superimposed over apertures 36 such that grooves 38 are positioned substantially throughout distal portion 35 on the inward-facing surface. In further embodiments of eyewear 10, dimples 37 and grooves 38 may be located in other areas of distal portion 35, or dimples 37 and grooves 38 may be absent from distal portion 35.

The distal ends of some conventional eyewear earstems are separated by a distance that is approximately the width of the head. Distal end 32 of earstems 30a is separated from a corresponding distal end of earstem 30b, but are relatively close together due to the lateral curvature in both of earstems 30a and 30b. A suitable separation distance between distal end 32 of earstems 30a and the corresponding distal end of earstem 30b is approximately one inch, but may be any distance less than two inches, for example. In some embodiments, however, the separation distance may be greater than two inches. When placing an article of eyewear upon a head, an individual generally slides the earstems past the temples, along the sides of the head, and over the ears, thereby accounting for the separation between the distal ends in conventional eyewear that is approximately the width of the head. Eyewear 10 may be placed upon the head in the same manner due to a flexibility in earstem 30a, particularly distal portion 35. A similar flexibility is inherent in the structure of earstem 30b.

The flexibility in earstem 30a, particularly distal portion 35, is primarily related to the structure discussed above and the material from which earstem 30a is fashioned. From an analytical viewpoint, earstem 30a is analogous to a beam subjected to a bending moment. Accordingly, the degree of flex in earstem 30a is inversely related to the area moment of inertia when calculated as a cross-section of earstem 30a. Apertures 36 reduce the area moment of inertia in earstem 30a, thereby increasing the flexibility of earstem 30a.

Two other features of earstem 30a that enhance the flexibility in distal portion 35 are the lateral thickness in distal portion 35 and the presence of dimples 37 and grooves 38. One skilled in the relevant art will recognize that the thickness of a beam in the direction of bending has a significant, or even predominant, effect upon the value of the area moment of inertia. Accordingly, a relatively small lateral thickness in distal portion 35 serves to decrease the area moment of inertia, thereby increasing flexibility. Furthermore, the presence of dimples 37 and grooves 38 also serve the decrease the area moment of inertia by decreasing the effective lateral thickness of distal portion 35. That is, removing material from distal portion 35, in the form of dimples 37 and grooves 38, serves to enhance the flexibility of earstem 30a.

The material forming earstem 30a also influences the degree of flexibility in distal portion 35. Whereas metals, such as steel, aluminum, and titanium are suitable for earstem 30a, other materials that have a lesser modulus of elasticity will provide greater flexibility. Accordingly, polymers such as polystyrene are also suitable for earstem 30a. Earstems 30a and 30b are formed integral with support section 20. Accordingly, the material forming earstems 30a and 30b will generally correspond with the material forming support section 20. With respect to eyewear 10', however, earstems 30a' and 30b' are formed separate from support section 20' and may, therefore, be formed of differing materials. Although earstem 30a' is formed separate from support section 20', a series of apertures 36' are defined in earstem 30a'. Earstem 30b' is structured to have a similar configuration.

The flexibility in earstems 30a and 30b cooperate with the shape of earstems 30a and 30b to provide eyewear 10 with a secure fit on the head. As discussed above, a suitable separation distance between distal end 32 of earstems 30a and the corresponding distal end of earstem 30b is approximately one inch, but may be any distance less than two inches, for example. Other articles of eyewear may have earstems that extend around the back of the head, but inflexibility of the earstems limits the distal ends from having a separation distance less than two inches. In eyewear 10, however, the flexibility of earstems 30a and 30b provides a configuration wherein the separation distance is less than the separation distance exhibited by some prior art eyewear, while retaining a comfortable and relatively easy manner of placing eyewear 10 upon the head and removing eyewear 10 from the head.

The present invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the present invention, as defined by the appended claims.

That which is claimed is:

1. An earstem for an article of eyewear, said earstem comprising:
   a connection portion configured to connect said earstem to the article of eyewear, said connection portion extending in a longitudinal direction;
   a distal portion located opposite said connection portion, said distal portion defining a plurality of apertures extending through said earstem, said apertures including at least one aperture with an elongate configuration, said at least one aperture being oriented to substantially coincide with a vertical direction, said vertical direction being orthogonal to said longitudinal direction; and
   a central portion positioned between said connection portion and said distal portion.

2. The earstem of claim 1, wherein said apertures have an elliptical configuration.

3. The earstem of claim 1, wherein said apertures are arranged in a series along said distal portion.

4. The earstem of claim 3, wherein said apertures increase in height as said apertures approach a distal end of said earstem.

5. The earstem of claim 1, wherein a plurality of dimples are defined in said distal portion.

6. The earstem of claim 1, wherein a plurality of grooves are defined in said distal portion.

7. The earstem of claim 6, wherein at least a portion of said grooves are aligned with said apertures.

8. The earstem of claim 6, wherein said apertures are positioned within at least a portion of said grooves.

9. The earstem of claim 1, wherein said connection portion is substantially straight.

10. The earstem of claim 1, wherein said distal portion curves in said vertical direction.

11. The earstem of claim 1, wherein said distal portion curves in a lateral direction, said lateral direction being orthogonal to both said longitudinal direction and said vertical direction.

12. The earstem of claim 1, wherein said distal portion curves in said vertical direction and in a lateral direction, said lateral direction being orthogonal to both said longitudinal direction and said vertical direction.

13. The earstem of claim 1, wherein said distal portion is flared in said vertical direction relative to said connection portion.

14. The earstem of claim 1, wherein a thickness of said connection portion is greater than a thickness of said distal portion.

15. The earstem of claim 1, wherein the earstem is incorporated into the article of eyewear.

16. An earstem for an article of eyewear, said earstem comprising:
   a connection portion configured to connect said earstem to the article of eyewear, said connection portion extending in a longitudinal direction to form a substantially straight section of said earstem;
   a distal portion located opposite said connection portion, said distal portion defining a series of apertures extending through said earstem, said apertures having an elongate configuration and an orientation that substantially coincides with a vertical direction, said vertical direction being orthogonal to said longitudinal direction, and said distal portion curving towards at least a lateral direction, said lateral direction being orthogonal to both said longitudinal direction and said vertical direction; and
   a central portion positioned between said connection portion and said distal portion.

17. The earstem of claim 16, wherein said apertures have an elliptical configuration.

18. The earstem of claim 16, wherein said apertures increase in height as said apertures approach a distal end of said earstem.

19. The earstem of claim 16, wherein a plurality of dimples are defined in said distal portion.

20. The earstem of claim 19, wherein said dimples are aligned with said series of apertures.

21. The earstem of claim 16, wherein a plurality of grooves are defined in said distal portion.

22. The earstem of claim 21, wherein at least a portion of said grooves are aligned with said apertures.

23. The earstem of claim 21, wherein said apertures are positioned within at least a portion of said grooves.

24. The earstem of claim 16, wherein said distal portion also curves towards said vertical direction.

25. The earstem of claim 16, wherein said distal portion is flared in said vertical direction relative to said connection portion.

26. The earstem of claim 16, wherein a thickness of said connection portion is greater than a thickness of said distal portion.

27. The earstem of claim 16, wherein the earstem is incorporated into the article of eyewear.

28. Frames for an article of eyewear, said frames comprising:
   a support section configured to receive lenses of the eyewear; and
   a pair of earstems positioned on opposite sides of said support section and extending away from said support section, each said earstem having:
      a connection portion configured to connect to said support section, said connection portion extending in a longitudinal direction to form a substantially straight section of said earstem;
      a distal portion located opposite said connection portion, said distal portion defining a series of elongate apertures extending through said earstem, said apertures being oriented to substantially coincide with a vertical direction, said vertical direction being orthogonal to said longitudinal direction; and
      a central portion positioned between said connection portion and said distal portion,
   wherein said distal portion of each said earstem curves in a lateral direction and toward each other, said lateral direction being orthogonal to both said longitudinal direction and said vertical direction.

29. The frames of claim 28, wherein said apertures have an elliptical configuration.

30. The frames of claim 28, wherein said distal portion of each said earstem also curves towards said vertical direction.

31. The frames of claim 28, wherein said distal portion of each said earstem is flared in said vertical direction relative to said connection portion.

32. The frames of claim 28, wherein a thickness of said connection portion is greater than a thickness of said distal portion.

33. The frames of claim 28, wherein the frames incorporate lenses to form the article of eyewear.

34. Frames for an article of eyewear configured to be worn on a head of an individual, said frames comprising:
a support section structured to receive lenses and position the lenses proximal to eyes of the individual; and
a pair of earstems connected to said support section, said earstems being structured to extend along a side of the head and over ears of the individual, and said earstems having a curved structure that is configured to extend around to a rear surface of the head such that distal ends of said earstems approach each other and have a separation less than two inches, and earstems defining a plurality of elongate apertures located adjacent said distal ends and extending in a substantially vertical direction.

35. The frames of claim 34, wherein said apertures have an elliptical configuration.

36. The frames of claim 34, wherein said apertures are arranged in a series extending along said earstems.

37. The frames of claim 36, wherein said apertures decrease in height as said apertures extend away from said distal ends.

38. The frames of claim 34, wherein portions of said earstems located adjacent said support section are substantially straight.

39. The frames of claim 34, wherein said earstems are configured to curve vertically adjacent to said distal ends.

40. The frames of claim 34, wherein said earstems each flare outward adjacent to said distal ends.

41. The frames of claim 34, wherein thicknesses of said earstems are greater adjacent said support section than adjacent said distal ends.

42. The frames of claim 34, wherein the frames incorporate lenses to form the article of eyewear.

43. An article of eyewear comprising:
frames with a support section and a pair of earstems extending from the support section, each earstem having:
a connection portion configured to connect said earstem to the article of eyewear, said connection portion extending in a longitudinal direction,
a distal portion located opposite said connection portion, said distal portion defining a plurality of apertures extending through said earstem, said apertures including at least one aperture with an elongate configuration, said at least one aperture being oriented to substantially coincide with a vertical direction, said vertical direction being orthogonal to said longitudinal direction, and
a central portion positioned between said connection portion and said distal portion; and
at least one lens secured to the support section.

44. The eyewear of claim 43, wherein said apertures have an elliptical configuration.

45. The eyewear of claim 43, wherein said apertures are arranged in a series along said distal portion.

46. The eyewear of claim 45, wherein said apertures increase in height as said apertures approach a distal end of said earstem.

47. The eyewear of claim 43, wherein said distal portion curves in said vertical direction and in a lateral direction, said lateral direction being orthogonal to both said longitudinal direction and said vertical direction.

48. The eyewear of claim 43, wherein said distal portion is flared in said vertical direction relative to said connection portion.

49. The eyewear of claim 43, wherein a thickness of said connection portion is greater than a thickness of said distal portion.

50. An article of eyewear comprising frames and at least one lens secured to the frames, the frames having:
a support section structured to receive the at least one lens and position the at least one lens proximal to eyes of the individual; and
a pair of earstems connected to said support section, said earstems being structured to extend along a side of the head and over cars of the individual, and said earstems having a curved structure that is configured to extend around to a rear surface of the head such that distal ends of said earstems approach each other and have a separation less than two inches, and earstems defining a plurality of elongate apertures located adjacent said distal ends and extending in a substantially vertical direction.

51. The eyewear of claim 50, wherein said apertures have an elliptical configuration.

52. The eyewear of claim 50, wherein said apertures are arranged in a series extending along said earstems.

* * * * *